(12) United States Patent
Oakley et al.

(10) Patent No.: US 12,236,454 B2
(45) Date of Patent: Feb. 25, 2025

(54) AUDIO-OUT-OF-HOME STREAMING AT A RETAIL LOCATION

(71) Applicant: Vibenomics, Fishers, IN (US)

(72) Inventors: Brent Oakley, Fishers, IN (US); Christopher Keaney, Fishers, IN (US)

(73) Assignee: Vibenomics, Fishers, IN (US)

( * ) Notice: Subject to any disclaimer, the term of this patent is extended or adjusted under 35 U.S.C. 154(b) by 0 days.

(21) Appl. No.: 17/941,463

(22) Filed: Sep. 9, 2022

(65) Prior Publication Data

US 2023/0083735 A1 Mar. 16, 2023

Related U.S. Application Data

(60) Provisional application No. 63/242,686, filed on Sep. 10, 2021.

(51) Int. Cl.
*G06Q 30/00* (2023.01)
*G06F 3/16* (2006.01)
*G06Q 30/0251* (2023.01)
*H04L 65/61* (2022.01)
*H04L 65/70* (2022.01)

(52) U.S. Cl.
CPC ......... *G06Q 30/0264* (2013.01); *G06F 3/165* (2013.01); *H04L 65/61* (2022.05); *H04L 65/70* (2022.05)

(58) Field of Classification Search
None
See application file for complete search history.

(56) References Cited

U.S. PATENT DOCUMENTS

| 7,742,950 B2 | 6/2010 | Wolinsky et al. |
| 7,912,759 B2 | 3/2011 | Wolinsky et al. |
| 8,095,950 B1 | 1/2012 | Lapevic |

(Continued)

OTHER PUBLICATIONS

Extended European Search Report, European Patent Office, European Patent Application No. 22195230.2, Feb. 7, 2023, 7 pages.

*Primary Examiner* — Christopher Stroud
(74) *Attorney, Agent, or Firm* — Taft Stettinius & Hollister LLP

(57) ABSTRACT

Embodiments of the present disclosure relate to segmenting the overall audio content streaming baseline into music content item segments and advertisement segment based on advertisement streaming parameters. Each music content item is dynamically determined to be streamed based on music content item parameters associated with the music content item segment. The music content item parameters are dynamically adjusted as each music content item is streamed during each music content item segment based on a duration of time remaining in the music content item segment. Each advertisement to stream is determined based on advertisement parameters. The advertisement parameters are dynamically adjusted as each advertisement is streamed during each advertisement segment based on a remaining quantity of advertisements remaining to be streamed. Each music content item is streamed as dynamically determined during each music content item segment and each advertisement is dynamically streamed during each advertisement segment.

18 Claims, 3 Drawing Sheets

(56) References Cited

U.S. PATENT DOCUMENTS

| | | |
|---|---|---|
| 8,502,056 B2 | 8/2013 | Oppenheimer |
| 8,639,563 B2 | 1/2014 | Angell et al. |
| 2003/0070167 A1* | 4/2003 | Holtz .................. G06F 16/958 |
| | | 705/14.69 |
| 2003/0120541 A1 | 6/2003 | Siann et al. |
| 2003/0216958 A1* | 11/2003 | Register ............ G06Q 30/0276 |
| | | 705/14.61 |
| 2003/0217170 A1* | 11/2003 | Nelson ................... H04L 67/10 |
| | | 709/246 |
| 2004/0015608 A1* | 1/2004 | Ellis ....................... A63F 13/61 |
| | | 709/246 |
| 2004/0031378 A1* | 2/2004 | Hughes ................ G10H 1/0058 |
| | | 84/609 |
| 2004/0225564 A1 | 6/2004 | Walsh et al. |
| 2005/0154636 A1* | 7/2005 | Hildinger ........... G06Q 30/0277 |
| | | 705/14.73 |
| 2005/0159104 A1* | 7/2005 | Valley ................... H04H 60/06 |
| | | 455/3.01 |
| 2006/0212348 A1* | 9/2006 | Lambert ................ H04L 67/06 |
| | | 705/14.52 |
| 2007/0150338 A1* | 6/2007 | Malik ................ G06Q 30/0264 |
| | | 705/14.61 |
| 2007/0265090 A1* | 11/2007 | Barsness ................. A63F 13/12 |
| | | 463/42 |
| 2008/0243583 A1* | 10/2008 | Miyaki .................. H04N 5/775 |
| | | 348/E7.071 |
| 2010/0011407 A1 | 1/2010 | Herlein et al. |
| 2010/0205049 A1* | 8/2010 | Long .................. G06Q 30/0252 |
| | | 705/14.5 |
| 2012/0215935 A1* | 8/2012 | Woods .................. G06F 16/686 |
| | | 709/231 |
| 2013/0103171 A1* | 4/2013 | Dangerfield ............ G06F 1/163 |
| | | 361/679.03 |
| 2013/0276026 A1* | 10/2013 | Sherwin ........... H04N 21/25883 |
| | | 725/35 |
| 2014/0081682 A1 | 3/2014 | Perlmuter |
| 2014/0358267 A1 | 12/2014 | Littlejohn et al. |
| 2015/0026308 A1* | 1/2015 | MacTiernan ....... H04N 21/6582 |
| | | 709/219 |
| 2016/0048562 A1* | 2/2016 | Joa ..................... G06Q 30/0255 |
| | | 707/756 |
| 2017/0131967 A1* | 5/2017 | Nieuwenhuys .......... G06F 3/165 |
| 2017/0351482 A1* | 12/2017 | Niuwenhuys .......... H04L 67/303 |
| 2018/0049688 A1* | 2/2018 | Knight ..................... G10L 25/63 |
| 2019/0187884 A1 | 6/2019 | Madgwick et al. |
| 2019/0215554 A1* | 7/2019 | Chaar .................. H04H 20/103 |
| 2019/0373316 A1* | 12/2019 | Yu ....................... H04N 21/6125 |
| 2021/0241319 A1* | 8/2021 | Seljan .................. G06F 16/953 |
| 2021/0294637 A1* | 9/2021 | Schmitz ................ H04L 67/52 |
| 2021/0392393 A1* | 12/2021 | Olsson ............... H04N 21/4331 |
| 2021/0409823 A1* | 12/2021 | Sen .................. H04N 21/44222 |
| 2022/0312072 A1* | 9/2022 | Taylor ................ H04N 21/8113 |

\* cited by examiner

AUDIO-OUT-OF-HOME STREAMING AT A RETAIL LOCATION

BACKGROUND

Conventional audio advertising has occurred since the advent of radio stations and continues up through current times not only on radio stations but also on streaming services of music, podcasts, and so on. Conventionally, audio advertising has occurred and continues to occur based on daypart programming. In doing so, the programming to be streamed each day is preemptively scheduled based on the time of day such that content is to be streamed. Advertisements are also pre-emptively scheduled to be streamed at specified times of each day. For example, at the tenth of every hour, advertisements may be streamed while the remaining time of each hour is reserved for the streaming of content.

However, daypart scheduling in an audio-out-of-home environment, such as in a retail location and/or place commerce, significantly limits the flexibility as well as the ease in which a retailer may schedule the audio-out-of-home streaming at their location. The rigid scheduling of advertisements at a specified time of each day limits the overall quantity of advertisements that may be played each day as there is a set amount of dayparts in each day where such advertisements may be scheduled. Further, daypart scheduling significantly hinders the selection of a song and/or content such that the duration of the song and/or content is concluded to then transition into the scheduled advertisement. Often times, the song and/or content is cut-off prematurely before the completion of the song and/or content so that the advertisement may stream as scheduled at the daypart thereby hindering the experience of the customer audience at the retail location. Further, daypart scheduling significantly hinders the ability of the retailer to stream messages and/or public service announcements to the customer audience in addition to streaming of content and advertising.

BRIEF SUMMARY

Embodiments of the present disclosure relate to a system that enables a retailer to customize the audio content items that are streamed at a retail location based on streaming parameters rather than a daypart schedule where the audio content items are pre-emptively scheduled and streamed at specified dayparts. An audio-out-of-home streaming system may be implemented to stream a plurality of audio content items at a retail location by a retailer to a customer audience located in the retail location to customize the audio content streamed to the customer audience. The system includes at least one processor and a memory coupled with the processor. The memory including instructions that when executed by the processor cause the processor to segment the overall audio content streaming baseline into a plurality of music content item segments and a plurality of advertisement segments based on a plurality of advertisement streaming parameters. The advertisement streaming parameters are indicative to a quantity of advertisements that is required to be streamed by the retailer and when each advertisement is to be streamed until the quantity of advertisements streamed is satisfied. During each music content item segment, the processor is configured to dynamically determine each music content item to stream based on a plurality of music content item parameters associated with the music content item segment. The music content item parameters are indicative to a genre of music that the retailer requires to be streamed during each music content item segment and are dynamically adjusted as each music content item is streamed based on a duration of time remaining in the corresponding music content item segment. During each advertisement segment, the processor is configured to dynamically determine each advertisement to stream based on a plurality of advertisement parameters. The advertisement parameters are indicative as to a type of advertisement that the retailer requires to be streamed based on a remaining quantity of advertisements from the quantity of advertisements remaining to be streamed. The processor is configured to stream each music content item as dynamically determined during each music content item segment and stream each advertisement as dynamically determined during each advertisement segment.

In an embodiment, a method may be implemented for streaming a plurality of audio content items at a retail location by a retailer to a customer audience located in the retail location to customize the audio content items streamed to the customer audience. An overall audio content streaming baseline is segmented into a plurality of music content item segments and a plurality of advertisement segments based on a plurality of advertisement streaming parameters. The advertisement streaming parameters are indicative to a quantity of advertisements that is required to be streamed by the retailer and when each advertisement is to be streamed until the quantity of advertisements streamed is satisfied. During each music content item segment, each music content item to stream is dynamically determined based on a plurality of music content item parameters associated with the music content item segment. The music content item parameters are indicative to a genre of music that the retailer requires to be streamed during each music content item segment and are dynamically adjusted as each music content item is streamed based on a duration remaining in the corresponding music content item segment. During each advertisement segment, each advertisement to stream is dynamically determined based on a plurality of advertisement parameters. The advertisement parameters are indicative as to a type of advertisement that the retailer requires to be streamed during each advertisement segment and are dynamically adjusted as each advertisement is streamed based on a remaining quantity of advertisements from the quantity of advertisements remaining to be streamed. Each music content item is streamed as dynamically determined during each music content item segment and each advertisement is streamed as dynamically determined during each advertisement segment.

Further embodiments, features, and advantages, as well as the structure and operation of the various embodiments, are described in detail below with reference to the accompanying drawings.

BRIEF DESCRIPTION OF THE DRAWINGS

Embodiments are described with reference to the accompanying drawings. In the drawings, like reference numbers may indicate identical or functionally similar elements.

DETAILED DESCRIPTION

Figure 1:
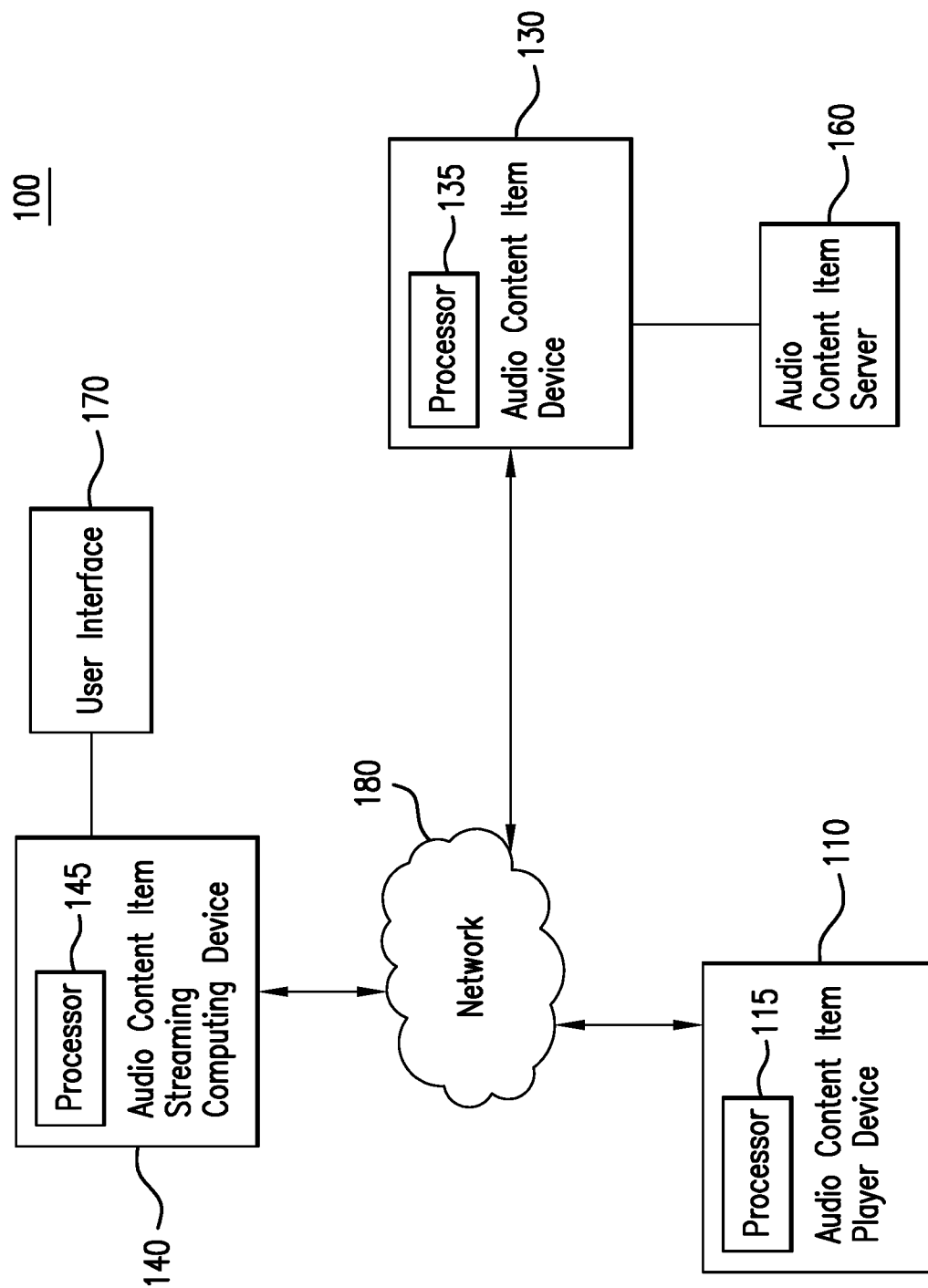
FIG. 1 shows an illustration of a an audio-out-of-home streaming system that may stream a plurality of audio content items at a retail location by a retailer to a customer audience located in the retail location to customize the audio content items streamed to the customer audience.

Embodiments of the disclosure generally relate to enabling a retailer to customize the streaming of audio content items to a customer audience at a retail location by segmenting the streaming based on various streaming parameters rather than pre-emptive and specified daypart scheduling. In an example embodiment, an overall content streaming baseline may be segmented into music content item segments in which music content items are streamed, advertisement segments in which advertisements are streamed, messaging segments in which messages are streamed, and interrupt segments in which interrupt segments are streamed. Within each segment, the appropriate audio content items are dynamically selected and then streamed based on streaming parameters rather than pre-emptive and specified daypart scheduling. In an example embodiment, the advertisement segments may include two advertisements that are played following music content item segments that are two songs in durations such that after every two songs, two advertisements are played.

Rather than pre-emptively scheduling the advertisements to stream at a specified daypart, such as every tenth of the hour, the advertisements are streamed based on streaming parameters. In an example embodiment, the streaming parameters may include the quantity of advertisements to stream in each advertisement segment, such as two advertisements to be streamed consecutively, and the duration of each music content item segment that is to stream music content items before each advertisement segment is streamed, such as after every two songs are streamed then the advertisement segment of two advertisements is streamed. The streaming of audio content items based on streaming parameters rather than pre-emptive daypart scheduling provides the flexibility for the retailer to increase the quantity of advertisements played during a period of time rather being limited to dayparts, such as streaming advertisements every tenth of the hour.

The streaming of audio content items based on streaming parameters also provides the flexibility to dynamically select the audio content items to stream based on the streaming parameters rather than dayparts. In an example embodiment, the song to stream to conclude the music content item segment before streaming the advertisements included in the subsequent advertisement segment may be selected as to the duration remaining in the music content item segment so that the song may be completed before streaming the subsequent advertisement. In such an example embodiment, a song with a three-minute duration may be selected to stream to conclude a music content item segment that has a duration of three minutes remaining rather than a five-minute song. In doing so, the three-minute song may be streamed to conclusion before the advertisement is streamed when the five-minute song would be cut-off before the advertisement is streamed. Thus, the streaming of audio content based on streaming parameters provides flexibility to dynamically select the audio content items to increase the quantity of advertisements streamed, increase the experience of the customer audience, as well as provide the retailer the flexibility to also stream messages and/or interrupts in addition to the advertisements and music content items.

In the Detailed Description herein, references to "one embodiment", an "embodiment", and "example embodiment", etc., indicate that the embodiment described may include a particular feature, structure, or characteristic, by every embodiment may not necessarily include the particular feature, structure, or characteristic. Moreover, such phrases are not necessarily referring to the same embodiment. Further, when a particular feature, structure, or characteristic may be described in connection with an embodiment, it may be submitted that it may be within the knowledge of one skilled in art to affect such feature, structure, or characteristic in connection with other embodiments whether or not explicitly described.

The following Detailed Description refers to the accompanying drawings that illustrate exemplary embodiments. Other embodiments are possible, and modifications can be made to the embodiments within the spirit and scope of this description. Those skilled in the art with access to the teachings provided herein will recognize additional modifications, applications, and embodiments within the scope thereof and additional fields in which embodiments would be of significant utility. Therefore, the Detailed Description is not meant to limit the embodiments described below.

System Overview

As shown in FIG. 1 an audio-out-of-home streaming system 100 may stream a plurality of audio content items at a retail location by a retailer to a customer audience located in the retail location to customize the audio content items streamed to the customer audience. Audio-out-of-home streaming system 100 includes an audio content item player device 110 that is located at the retail location and audibly plays the audio content items at the retail location such that the customer audience located at the retail location is able to hear the audio content items streamed by audio content item streaming device 110 at the retail location.

An audio content item streaming computing device 140 may dynamically determine the audio content streaming items that are to be streamed to the retail location based on different streaming parameters that are to be satisfied by the streaming of the audio content items at the retail location. Audio content item streaming device 140 may then stream via a network 180 such dynamically determined audio content items so that audio content item player device 110 may then audibly play the streamed audio content items at the retail location. Audio content item streaming device 140 may dynamically determine the audio content items to stream based on the audio content items that are available to stream as provided by audio content item device 130 and stored on an audio content item server 160. A user may engage audio content item streaming computing device via a user interface 170. Audio content item streaming device 110 includes a processor 115. Audio content item streaming computing device 140 includes a processor 145. An audio content item device includes a processor 135.

Retailers have a significant opportunity to significantly improve the experience of the customer audience that visits their retail locations while taking advantage of disseminating messages and/or advertisements to the customer audience that may benefit the retailer as the customer audience is present at the retail location. Individuals visit retail locations of all types throughout their daily lives. Such retail locations include actual locations of retail where consumers purchase goods such as but not limited to grocery stores, malls, clothing stores, hardware stores, gas stations, convenient stores and/or any other type of retail location where individuals as consumers purchase items that will be apparent to those skilled in the relevant art(s) without departing from the spirit and scope of the disclosure. Retail locations also include locations of commerce where individuals as patrons purchase meals and/or events and such retail locations host such that individuals as patrons while engaging those meals and/or events such as restaurants, bowling alleys, arcades, rinks, hotels, swimming pools, kid zones, and/or any other type of retail location that is a place of commerce that hosts customers that will be apparent to those skilled in the relevant art(s) without departing from the spirit and scope of the disclosure. Thus, a retail location is any type of location where consumers purchase goods and/or patrons purchase services and are located at the retail location such that streaming of audio content items may improve the experience of the customer while providing an opportunity for the retailer to expose the customer to messages and/or advertisements that may benefit the retailer as the customer is present at the retail location.

As individuals are located at a retail location as consumers and/or patrons, the retailer has an opportunity to provide an experience for the individuals to improve the experience of the individuals such that the individuals continue to return to the retail location. Further, the retailer has an opportunity to take advantage of the individuals located in their retail locations to provide the individuals as consumers and/or patrons with messages and/or advertisements that may benefit the retailer should the individuals be exposed to such messages and/or advertisements when located at the retail location. In doing so, the retailer may disseminate audio content items within the retail location such that the individuals as consumers and/or patrons of the retailer are a customer audience of the retailer in that the customer audience is exposed to the audio content items disseminated by the retailer while the customer audience is located at the retail location of the retailer.

The audio content items may be disseminated to the customer audience located at the retail location via audio content item player device 110 such that audio content item player device 110 audibly disseminates the audio content items in a manner that the customer audience located at the retail location is able to audibly hear the audio content items audibly disseminated by audio content item player device 110. The audio content items may include audio files that when streamed via a network and then played may be audibly disseminated and audibly heard by the customer audience located at the retailer location. For example, audio content player device 110 may disseminate songs that are streamed via network 180 to audio content player device 110 that are audibly played throughout the retail location such that the customer audience located at the retail location may audibly hear the songs disseminated by audio content player device 110. The audio content items may include but are not limited to songs, advertisements, messages, interrupts, pod casts, movie audio, television show audio, sporting event audio replays, and/or any other type of audio content item that is streamed via network 180 and then audibly disseminated such that the customer audience located at the retail location may audibly hear the audio content items that will be apparent to those skilled in the relevant art(s) without departing from the spirit and scope of the disclosure.

The retailer may take advantage of the opportunity to audibly disseminate audio content items to the customer audience located at the retail location via audio content item player 110 by disseminating audio content items that improve the experience of the customer audience while located at the retail location to increase the likelihood that the customer audience returns to the retail location. The retailer may also disseminate audio content items via the audio content item player 110 that benefit the retailer such as by increasing the likelihood that the customer audience purchases goods and/or services sold by the retailer thereby increasing the likelihood of the retailer to increase sales. For example, the retailer may audibly disseminate songs via audio content item player 110 that are appreciated by the customer audience and improves the experience of the customer audience while located at the retail location thereby increasing the likelihood that the customer audience returns to the retail location. The retailer may also audibly disseminate advertisements for goods and/or services sold at the retail location thereby increasing the likelihood that the customer audience purchases goods and/or services sold by the retailer thereby increasing the sales of the retailer.

Audio content item player device 130 may be a device that audibly disseminates the audio content items that are streamed via network 180 by audio content item streaming device 140 such that the customer audience located in the retail location that audio content item player device 130 is located is able to audibly hear the audio content items streamed by audio content item streaming computing device 140 to audio content item player device 130 via network 180. Audio content item player device 130 may be not limited to a mobile telephone, a smartphone, a workstation, a portable computing device, other computing devices such as a laptop, or a desktop computer, cluster of computers, set-top box, a cloud server, web browsers such as Google Chrome and Internet Explorer, web applications and/or any other suitable electronic device that is capable of audibly disseminating the audio content items that will be apparent to those skilled in the relevant art(s) without departing from the spirit and scope of the disclosure.

In an embodiment, multiple modules may be implemented on the same computing device. Such a computing device may include software, firmware, hardware or a combination thereof. Software may include one or more applications on an operating system. Hardware can include, but is not limited to, a processor, a memory, and/or graphical user interface display.

Conventionally, retailers may audibly disseminate audio content items based on pre-emptive daypart scheduling similar to how the radio disseminates songs and advertisements. In doing so, retailers are limited to scheduling advertising to a time of day in which advertisements are to be run and then attempt to fill in the remaining times of day with songs. For example, a retailer may schedule to audibly disseminate advertisements at every tenth of every hour such that the customer audience located in the retail location audibly hears advertisements every tenth of the hour. The retailer may then fill in the remaining portions of every hour with songs such that the customer audience located in the retail location audibly hears songs when not audibly hearing advertisements every tenth of every hour.

The conventional audible dissemination of audio content items based on pre-emptive daypart scheduling significantly limits the flexibility of the retailer in audio content items that may be audibly disseminated while hindering the experience of the customer audience located at the retail location. The retailer may be limited to the quantity of advertisements that the retailer may audibly disseminate based on the pre-emptive daypart scheduling as the retailer may only disseminate advertisements based on the scheduled daypart. For example, the retailer may schedule a single advertisement to be audibility disseminated every tenth of the hour. In doing so, the retailer is limited to audibly disseminating 6 advertisements every hour and 144 advertisements in a day. In order to increase the quantity of advertisements that are audibly disseminated each hour and/or each day, the retailer must add dayparts of each hour to schedule the audible dissemination of the advertisements.

However, in doing so, the retailer must audibly disseminate less songs and thereby hinder the experience of the customer audience located at the retail location in that the customer audience typically has an increased experience when listening to an increased quantity of songs. Thus, the retailer is limited to advertisement revenue that may be generated each day due to the limited quantity of advertisements that may be audibly disseminated based on pre-emptive daypart scheduling. In order to increase the advertisement revenue generated each day by the retailer, the retailer risks negatively impacting the experience of the customer audience by forcing the customer audience to listen to an increased quantity of advertisements as compared to songs thereby risking that the customer audience fails to return to the retail location to purchase goods and/or services offered for sale by the retailer at the retail location.

The retailer may also be limited to the transition of audibly disseminating songs to audibly disseminating advertisements when conducting conventional audible dissemination of audio content items based on pre-emptive daypart scheduling. Conventional pre-emptive daypart scheduling of advertisements, such as audibly disseminating an advertisement every tenth of every hour, requires that as the clock strikes every tenth of every hour, then an advertisement is audibly disseminating. However, such structured pre-emptive daypart scheduling requires that songs that are audibly disseminated in between the audible dissemination of advertisements be selected such that when the time arises for an advertisement to be audibly disseminated, the song audible dissemination of the song is completed before the audible dissemination of the advertisement. Should the duration of the song not be completed before the audible dissemination of the advertisement, then the song is conventionally cut-off before the completion of the song so that the advertisement that is scheduled to be audibly disseminated at the specified daypart may do so unhindered and timely.

Advertisements have different lengths of duration as well as the quantity of consecutive advertisements audibly disseminated during each pre-emptively scheduled daypart may vary significantly throughout an hour period and/or a 24-hour period. Further the duration of each song that is available to be audibly disseminated also varies significantly. The retailer is conventionally required to pre-emptively select each advertisement that is to be audibly disseminated at each daypart and then determine the duration of each advertisement to be audibly disseminated at each daypart. Then, the retailer is conventionally required to sift through each song that is available to audibly disseminate between the audible dissemination of advertisements at each scheduled daypart and piece together songs that have durations that when audibly disseminated will have the song completed before the audible dissemination of the scheduled advertisement to prevent the song from being cut-off before the audible dissemination of the scheduled advertisement.

Such conventional pre-emptive daypart scheduling is a significant challenge for the retailer to prevent songs from being cut-off and/or to prevent a period of silence following the completion of a song that is audibly disseminated and before the scheduled daypart of the advertisement to be audibly disseminated. Often times, such pre-emptive scheduling of songs to be audibly disseminated between the daypart scheduling of advertisements such that a song is not cut-off and/or a period of silence is prevented is just not possible for the retailer. In doing so, throughout each hour and/or 24-hour period, songs are cut-off and/or there are periods of silence on numerous occasions before each scheduled daypart advertisement is audibly disseminated. Such cut-off of songs and/or period of silences decreases the experience of the customer audience located at the retail location thereby increasing the risk that the customer audience fails to return to the retail location to purchase the goods and/or services provided by the retailer.

The retailer may also be significantly limited in pre-emptively customizing the daypart schedule of audio content items to be audibly disseminated. The retailer may have events that are scheduled to occur each day that are not reoccurring on an hourly and/or daily basis. Such non-reoccurring events may require customized audible dissemination of audio content items. For example, a retail location that hosts birthday parties may have a non-reoccurring event of a birthday party that is scheduled and may require a customized audible dissemination of audio content items such as messages that are to be audibly disseminated as well as specified songs that are to be audibly disseminated and then the termination of advertisements that are audibly disseminated during the birthday party.

The conventional pre-emptive daypart scheduling of non-reoccurring events is a significant challenge for the retailer as the retailer has to pre-emptively schedule each of the audio content items that are to be audibly disseminated during the non-reoccurring event. In doing so, the retailer must pre-emptively daypart schedule each message that is to be audibly disseminated as well as each song and then prevent any advertisements from being audibly disseminated if required. After the pre-emptive daypart scheduling of the non-reoccurring event is completed, the retailer must then determine the impact of the pre-emptive daypart scheduling of the non-reoccurring event has on the remaining daypart schedule for the 24-hour period and/or week period and so on.

In doing so, conventionally the retailer is required to then adjust the pre-emptive daypart schedule to accommodate the lost advertisements not audibly disseminated during the non-reoccurring event. The retailer then has to add advertisements to be audibly disseminated after the non-reoccurring event to make up for the lack of advertisements not audibly disseminated during the non-reoccurring event. The retailer then has to adjust the songs pre-emptively selected to be audibly disseminated after the non-reoccurring event as the duration in between the audible dissemination of advertisements may have been adjusted and the previous selection of songs may no longer be adequate and so on. In doing so, the time and resources devoted by the retailer to accommodate the audile dissemination of audible content items for the non-reoccurring event is significantly increased while also increasing the likelihood of the cut-off of songs and/or silence before the audible dissemination of advertisements following the non-reoccurring event due to the increase in difficulty for the retailer to accommodate the non-reoccurring event.

Rather than be limited to conventional pre-emptive daypart scheduling of audio content items, audio content item streaming computing device 140 may stream a plurality of audio content items at a retail location to a customer audience positioned in the retail location to customize the audio content items streamed to the customer audience. Audio content item streaming computing device 140 may dynamically determine each audio content item to stream based on numerous streaming parameters. Such numerous streaming parameters may include a timeframe to stream specific audio content items relative to the time of day, but such a timeframe related parameter is only a single parameter that is incorporated and even such a timeframe parameter is dynamic. For example, a music block may be scheduled to be streamed within a time from of 8:00 am to noon, but within that time frame of 8:00 am to noon, the music that is streamed as well as other audio content items, such as advertisements, may be dynamically selected to be streamed based on numerous other streaming parameters. In such an example, two songs may be streamed before two advertisements are streamed from the timeframe of 8:00 am to noon.

The dynamic streaming of audio content items based on streaming parameters enables audio content item steaming computing device 140 to have the flexibility to determine which audio content items to stream when it is time to stream such audio content items. Rather than be hindered at pre-emptively scheduling an audio content item to stream based on a rigid daypart schedule, audio content item streaming computing device 140 may determine the appropriate audio content item to stream based on the streaming parameters that are present at the time of streaming. For example, audio content item streaming device 140 may analyze the streaming parameters of having already streamed three consecutive songs from the 1990s pop music genre while having a duration of 3 minutes and 30 seconds remaining before having to stream an advertisement. Audio content item streaming device 140 may then dynamically select a song from the 1990s pop music genre that has a duration of 3 minutes and 30 seconds to enable the streaming of the song to be completed to easily transition into the streaming of the advertisement rather than having the song cut-off and/or have a period of silence before the advertisement is streamed.

Streaming parameters are indicative as to the audio content item that is to be streamed such that when the streaming parameters are satisfied, the audio content item that is dynamically determined to stream fits into the overall requirements of the retailer as to the audio content items that are to be streamed such that such requirements are satisfied while also enabling the selection of such audio content items to be executed in a manner that enables an increased satisfaction of the customer audience located at the retail location of the streaming. For example, the retailer may require that a quantity of advertisements be streamed within a duration of time while also requiring that a quantity of different music genres be satisfied when streaming the songs in between the streaming of the advertisements. Audio content item streaming computing device 140 may dynamically determine the advertisements to stream to ensure the appropriate streaming parameters in the quantity of advertisements are satisfied while also determining the appropriate songs to satisfy the quantity of different music genres to be streamed while also streaming the songs with the appropriate durations to prevent any cut-offs in the streaming of the songs.

The streaming parameters may include but is not limited to advertisement streaming parameters that are indicative to a quantity of advertisements that is required to be streamed by the retailer and when each advertisement is to be streamed until the quantity of advertisements streamed is satisfied. Music content item parameters are indicative to a genre of music that the retailer requires to be streamed during each music content item segment and are dynamically adjusted as each music content item is streamed based on a duration of time remaining in the corresponding music content item segments. Advertisement parameters are indicative as to a type of advertisement that the retailer requires to be streamed during each advertisement segment and are dynamically adjusted as each advertisement is streamed based on a remaining quantity of advertisements from the remaining quantity of advertisements from the quantity of advertisements remaining to be streamed.

Messaging parameters are indicative to a quantity of messages that are to be streamed each messaging segment. Messaging segment parameters are indicative as to when each message included in each messaging segment is to be streamed in each corresponding messaging segment and relative to when each music content item segment is to conclude before each corresponding messaging segment. Interrupt parameters are indicative to a corresponding specified time associated with the overall streaming baseline that each corresponding interrupt is to be streamed. Streaming parameters may include any type of parameter that is indicative as to each audio content item that is dynamically streamed to satisfy the requirements of the retailer while increasing the satisfaction of the customer audience that will be apparent to those skilled in the relevant art(s) without departing from the spirit and scope of the disclosure.

Audio content item streaming computing device 140 may segment an overall audio content streaming baseline into several audio content item segments based on the streaming parameters such that each audio content item segment includes a string of audio content items with similar features that are streamed consecutively. For example, audio content item streaming computing device 140 may segment the overall audio content item streaming baseline to stream six songs consecutively in a music content item segment and then segment the audio content item streaming baseline to segment three advertisements consecutively and then segment the audio content item streaming baseline to stream four songs consecutively and then stream the audio content item streaming baseline to stream two advertisement segments consecutively and so on. Thus, each audio content item segment is determined based on the audio content items with similar features included in each audio content segment that are consecutively streamed before audio content items of different features are then consecutively streamed defining a different audio content item segment.

The segmentation of the overall audio streaming baseline into different audio content item segments enables audio content item streaming computing device 140 to dynamically determine the audio content items to stream based on the various different streaming parameters by satisfying different streaming parameters with each audio content item segment. Audio content item streaming computing device 140 may determine when to transition to a different audio content item segment, the duration of each audio content item segment, the quantity of audio content items included in each audio content item segment and so on based on the various different streaming parameters that are dynamically changing as different streaming parameters are satisfied.

For example, audio content item streaming computing device 140 may segment the overall audio streaming baseline into different music content item segments and advertisement segments to satisfy the streaming parameters of streaming seven advertisements in an hour duration but is not to stream more than one advertisement in each advertisement segment during the hour duration while streaming songs from different music genres in between each advertisement segment. In doing so, audio content item streaming device 140 segments the overall audio streaming baseline for that hour duration into different music content item segments to stream the different songs from the different genres while also segmenting the overall audio streaming baseline for that hour duration into the seven different advertisement segments with each advertisement segment including a single advertisement that is streamed in between each music content item segment.

The overall audio content streaming baseline is a baseline structure of which the retailer requests to stream audio content items in that the overall audio content streaming baseline includes an overall duration that is then dynamically carved up into the different audio content item segments by audio content item streaming computing device 140. For example, the overall content streaming baseline may include a 24-hour daily structure that has a duration of from Sunday to Saturday. Audio content item streaming computing device 140 may then carve up the overall content item streaming baseline into numerous different audio content item segments based on the dynamically changing audio content parameters. In such an example, the streaming parameters may require that that songs of 90s genre be streamed from 7:00 am to 5:00 pm on Monday while also requiring 20 advertisements to be streamed from 7:00 am to 5:00 pm with 2 consecutive advertisements to be streamed at a time. Audio content item streaming device 140 may then segment the overall audio content streaming baseline of 7:00 am to 5:00 pm on Monday to include music item segments that stream songs from the 90s genre while also segmenting the overall audio content baseline of 7:00 am to 5:00 pm to stream 20 advertisements with 2 consecutive advertisements to be streamed in each advertisement segment.

The segmentation of the overall audio content streaming baseline into different audio content item segments based on the streaming parameters enables audio content item streaming device 140 to have the flexibility to dynamically determine each audio content item that is to be streamed in each audio content item segment. Rather than being conventionally limited to the pre-emptive scheduling of audio content items based on daypart scheduling, audio content item streaming device 140 may instead segment the overall audio content item streaming baseline and then dynamically determine the audio content items to stream within each segment. In doing so, audio content item streaming device 140 may not be hindered to conventional daypart scheduling where advertisements are audibly disseminated at specified times but may rather determine the streaming parameters that are dynamically changing and then segment the overall audio content streaming baseline based on the dynamically changing streaming parameters. As a result, audio content item streaming device 140 may continuously segment and dynamically determine the audio content items to stream in each segment to satisfy the requirement of the retailer while also providing increased experience of the customer audience.

Audio content item streaming device 140 may segment the overall audio content streaming baseline into advertisement segments, music content item segments, messaging segments, interrupt segments, and/or any other type of segment that includes audio content items of similar features that are strung together and streamed consecutively that will be apparent to those skilled in the relevant art(s) without departing from the spirit and scope of the disclosure. Audio content item streaming computing device 140 may be a mobile telephone, a smartphone, a workstation, a portable computing device, other computing devices such as a laptop, or a desktop computer, cluster of computers, set-top box, a cloud server, web browsers such as Google Chrome and Internet Explorer, web applications, and/or any other suitable electronic device that may dynamically stream audio content items that will be apparent to those skilled in the relevant art(s) without departing from the spirit and scope of the disclosure.

In an embodiment, multiple modules may be implemented on the same computing device. Such a computing device may include software, firmware, hardware or a combination thereof. Software may include one or more applications on an operating system. Hardware can include, but is not limited to, a processor, a memory, and/or graphical user interface display.

The user may engage the overall audio streaming baseline and determine several streaming parameters via user interface 170 of audio content item streaming device 140. User interface 170 may include any type of display device including but not limited to a touch screen display, a liquid crystal display (LCD) screen, and/or any other type of display device that includes a display that will be apparent from those skilled in the relevant art(s) without departing from the spirit and scope of the present disclosure.

Audio content item streaming device 140 may stream the numerous different audio content items as provided by audio content item device 130 via network 180 based on the numerous different and dynamically changing streaming parameters. Audio content item device 130 may store and/or retrieve each of the audio content items that audio content item streaming device 140 requests to stream as stored in audio content item server 160. Audio content item streaming device 140 may stream the numerous audio content items as provided by audio content item device 130 via network 180 in which audio content item device 130 may be a mobile telephone, a smartphone, a workstation, a portable computing device, other computing devices such as a laptop, or a desktop computer, cluster of computers, set-top box, a cloud server, web browsers such as Google Chrome and Internet Explorer, web applications, cloud based storage devices such as Dropbox and Google Drive, and/or any other suitable electronic device that includes audio content items that will be apparent to those skilled in the relevant art(s) without departing from the spirit and scope of the disclosure.

In an embodiment, multiple modules may be implemented on the same computing device. Such a computing device may include software, firmware, hardware or a combination thereof. Software may include one or more applications on an operating system. Hardware can include, but is not limited to, a processor, a memory, and/or graphical user interface display.

As shown, audio content items may be audibly disseminated at the retail location by audio content item player device 110 that audibly disseminates audio content items that are streamed by audio content item streaming computing device 140 and provided by audio content item device 130 via network 180. Network 180 includes one or more networks, such as the Internet. In some embodiments of the present disclosure, network 180 may include one or more wide area networks (WAN) or local area networks (LAN). Network 180 may utilize one or more network technologies such as Ethernet, Fast Ethernet, Gigabit Ethernet, virtual private network (VPN), remote VPN access, a variant of IEEE 802.11 standard such as Wi-Fi, and the like. Communication over network 180 takes place using one or more network communication protocols including reliable streaming protocols such as transmission control protocol (TCP). Each of the numerous user communications devices 140 may interface with multi-tenant computing device 110 via network 180 through an application programming interface (API), web interface and/or any other type of interface that will be apparent from those skilled in the relevant art(s) without departing from the spirit and scope of the present disclosure. These examples are illustrative and not intended to limit the present disclosure.

Streaming of Audio Content Items

As noted above, audio content item streaming computing device 140 streams audio content items at a retail location to a customer audience located at the retail location to customize the audio content items streamed to the customer audience. Audio content item streaming computing device 140 may segment the overall audio content item streaming baseline into different audio content item segments in which audio content items of similar features may be strung together and streamed consecutively before the next audio content item segment that includes audio content items of features that differ from the audio content items streamed previously in the previous audio content item segment. In doing so, audio content item streaming computing device 140 has the flexibility to satisfy the streaming parameters of the different audio content items that are to be streamed while providing an increase in the experience of the customer audience located at the retail location.

Specifically, audio content item streaming computing device 140 may segment the overall audio content streaming baseline into a plurality of music content item segments and a plurality of advertisement segments based on a plurality of advertisement streaming parameters. The advertisement streaming parameters are indicative to a quantity of advertisements that is required to be streamed by the retailer and when each advertisement is to be streamed until the quantity of advertisements streamed is satisfied. The retailer may have streaming parameters that are to be satisfied within the overall audio content streaming baseline such that a quantity of advertisements is to be streamed within specified blocks of time. For example, the retailer may be contractually required to stream 26 different advertisements in a block of time from 8:00 am to noon in which 10 of the advertisements streamed within the block of time from 8:00 am to noon. In doing so, audio content item streaming computing device 140 streams advertisements in order to satisfy the streaming parameters within the block of time from 8:00 am to noon to stream 26 different advertisements.

Audio content item streaming computing device 140 may segment the overall audio streaming baseline based on the advertisement streaming parameters in that the retailer typically has to satisfy the advertisement streaming parameters to achieve specific levels of advertisement revenue from the streaming of the advertisements and/or satisfy advertisement contracts in which the retailer has entered to stream specific quantities of specific types of advertisements. The retailer may have entered into an advertisement contract to stream a specific company's advertisement for a specific quantity of streams within a block of time in order for the retailer to receive advertisement revenue from that advertisement contract.

As a result, audio content item streaming computing device 140 may segment the overall audio content streaming baseline based on the advertisement streaming parameters to ensure that the advertisement streaming parameters are satisfied when streaming audio content items within the overall audio content streaming baseline. In doing so, audio content item streaming computing device 140 may segment the overall audio content streaming baseline into the advertisement segments to ensure that the advertisement streaming parameters in the quantity of advertisements that are to be streamed within the specified block of time is satisfied. Audio content item streaming computing device 140 may also segment the overall audio content streaming baseline into the music content item segments in which audio content streaming computing device 140 segments the overall audio content streaming baseline to stream the music content items when advertisement segments are not streaming advertisements. In doing so, the retailer is ensured to satisfy the advertisement streaming parameters to satisfy any advertisement requirements while increasing the experience of the customer audience with the streaming of music content items when advertisements are not streaming.

Pre-emptively scheduling each advertisement at a conventional specified daypart where the advertisement that is selected to be audibly disseminated is selected based on the type of advertisement significantly limits the quantity of advertisements that may be audibly disseminated during a period of time. Rather, audio content item streaming computing device 140 segmenting the overall content streaming baseline into advertisement segments and music content item segments based on the advertisement parameters enables audio content item streaming computing device 140 to increase the quantity of advertisements that are streamed during the block of time included in the overall content streaming baseline while also satisfying the advertisement requirements of the type of advertisement that is to also be streamed during the block of time. Audio content item streaming device 140 may dynamically determine each advertisement to stream in each advertisement segment as well as the music content item to stream in each music content item segment based on the time remaining during the block of time in which the advertisement requirements are to be satisfied. In doing so, the quantity of advertisements streamed during the block of item may be increased while satisfying the advertisement requirements of the type of advertisement that is to be streamed while not negatively impacting the overall experience of the customer audience.

For example, rather than conventionally disseminating advertisements as pre-emptively selected and scheduled at every tenth of the hour, audio content item streaming computing device 140 may segment the overall audio content item streaming baseline into advertisement segments that include two advertisements in duration that are then streamed after every song that is streamed. Audio content item streaming computing device 140 may then dynamically determine each advertisement to be streamed in each advertisement segment of two advertisements as well as music content item that is to be streamed in each music content item segment that includes a single music content item. Then as after each advertisement is streamed in each advertisement segment and after each music content item that is streamed in each music content item segment, audio content item streaming computing device 140 may then dynamically determine each subsequent advertisement to be streamed in each advertisement segment and each music content item to be streamed in each music content item segment based on the time remaining in a specified block of time to stream a specific quantity of advertisements as well as a specific type of advertisements as required by the advertisement contracts.

In determining the time remaining in each block of time based on the duration of time occupied by the streaming of each preceding advertisement and music content item, audio content item streaming computing device 140 may dynamically determine each subsequent advertisement and music content item to stream in order increase the quantity of advertisements streamed during a block of time while increasing the overall experience of the customer audience by also streaming music content items. For example, in the block of time from 8:00 am to noon, audio content item streaming computing device 140 may stream music content items that last 5 to 6 minutes in duration and advertisements that last 30 seconds to 60 seconds in duration. However, as audio content item streaming computing device 140 streams each music content item that lasts 5 to 6 minutes and each advertisement that lasts 30 seconds to 60 seconds in duration, audio content streaming computing device 140 may then subsequently dynamically determine music content items that last 3 to 5 minutes in duration and advertisements that last 15 to 30 seconds in duration in order to increase the quantity of advertisements that are streamed in the block of time from 8:00 am to noon while increasing the overall experience of the customer audience by also continuing to stream music content items. Thus, the dynamic streaming of music content items and advertisements by segmenting of the overall audio content streaming baseline into advertisement segments and music content item segments and then the dynamic selection of the music content items and advertisements to stream enables any advertisement requirements to be satisfied without negatively impacting the overall experience of the customer audience.

During each music content item segment, audio content item streaming device 140 may dynamically determine each music content item to stream based on music content item parameters associated with the music content item segment. The music content item parameters are indicative to a genre of music that the retailer requires to be streamed during each music content item segment and are dynamically adjusted as each music content item is streamed based on a duration of time remaining in the corresponding music content item segment. After the overall audio content streaming baseline is segmented into the music content item segments and the advertisement segments based on the advertisement steaming parameters, audio content item streaming device 140 may then dynamically determine each music content item to stream in the music content item segment.

In dynamically determining the music content item to stream during each music content item segment, audio content item streaming device 140 may dynamically adapt to determining which media content item to stream based on the music content item parameters that are to be satisfied when the time to stream the music content item has arrived. At the time to stream the music content item has arrived, audio content item streaming device 140 may dynamically determine the genre of music that the music content item should include in order to satisfy the requirements of the retailer as to the genre of music that is to be satisfied when streaming the music content items during the overall audio content streaming baseline. For example, the retailer may require that specific percentages of the music content items be streamed during the overall audio content streaming baseline from different genres of music. Audio content item streaming device 140 may dynamically determine the percentages of each genre of music that is remaining to be streamed at the time to stream the music content item has arrived and audio content item streaming device 140 may then dynamically determine the music content item to stream based on the percentages of each genre of music that is remaining to be streamed.

At the time to stream the music content item has arrived, audio content item streaming device 140 may also dynamically determine the duration of time remaining in the media content item segment to stream the media content item. Although audio content item streaming computing device 140 may determine to stream a specified quantity of music content items in each music content item segment, audio content item streaming computing device 140 may dynamically determine which music content item to stream based on the duration of time remaining in the media content item segment. For example, audio content item streaming computing device 140 may stream two songs in each music content item segment. Rather than simply selecting two songs that satisfy the genre of music that is to be streamed, audio content item streaming computing device 140 may also dynamically determine the songs to stream based on the duration of time remaining in the music content item segment. In doing so, audio content item streaming computing device 140 may increase the quantity of advertisements that may be streamed in a block of time of the overall audio content streaming baseline by dynamically determining to stream music content items with a decreased duration when there is a decrease in duration of time remaining in each music content item segment while still increasing the overall experience of the customer audience.

During each advertisement segment, audio content item streaming computing device 140 may determine each advertisement to stream based on a plurality of advertisement parameters. The advertisement parameters are indicative as to a type of advertisement that the retailer requires to be streamed during each advertisement segment and are dynamically adjusted as each advertisement is streamed based on a remaining quantity of advertisements from the quantity of advertisements remaining to be streamed. As noted above, the retailer may be required to stream a specified quantity of advertisements within a block of time as well as a specified type of advertisement that is also to be streamed within the block of time based on advertisement contracts. Rather than pre-emptively select and schedule each advertisement that is to be disseminated based on a conventional daypart schedule, audio content item streaming computing device 140 may dynamically determine each advertisement to stream in each advertisement segment on the remaining advertisement parameters that are yet to be satisfied.

For example, audio content item streaming computing device 140 may be required to stream 26 advertisements in the block of time of 8:00 am to noon and of those 26 advertisements, 10 endemic advertisements, 10 non-endemic advertisements, and 6 adult beverage advertisements are to be streamed based on the advertisement contracts. Audio content item streaming computing device 140 may then determine each advertisement to stream based on the remaining advertisement parameters that are yet to be satisfied. In such an example, audio content item streaming computing device 140 may have already streamed 13 advertisements in the block of time 8:00 am to noon. Audio content item streaming device 140 may then dynamically determine the remaining endemic advertisements, non-endemic advertisements, and adult beverage advertisements to determine which advertisement to stream as the 14$^{th}$ advertisement based on the 13 advertisements previously streamed. In doing so, audio content item streaming computing device 140 may dynamically determine each advertisement to stream based on the advertisement parameters remaining to be satisfied based on the previously streamed advertisements.

Advertisement parameters may include but are not limited specific types of advertisements. Such specific types of advertisements may include but not limited to endemic advertisements, non-endemic advertisements, adult beverage advertisements, self-promotion advertisements, generic advertisements and/or any other type of advertisement that the retailer may be required to satisfy items that will be apparent to those skilled in the relevant art(s) without departing from the spirit and scope of the disclosure.

At the time to stream the advertisement has arrived, audio content item streaming device 140 may also dynamically determine the duration of time remaining in the advertisement segment to stream the advertisement. Although audio content item streaming computing device 140 may determine to stream a specified quantity of advertisements in each advertisement segment, audio content item streaming computing device 140 may dynamically determine which advertisement to stream based on the duration of time remaining in the advertisement segment.

For example, audio content item streaming computing device 140 may stream two advertisements in each advertisement segment. Rather than simply selecting two advertisements that satisfy the remaining types of advertisements yet to satisfy hat are to be streamed, audio content item streaming computing device 140 may also dynamically determine the advertisements to stream based on the duration of time remaining in the advertisement segment. In doing so, audio content item streaming computing device 140 may increase the quantity of advertisements that may be streamed in a block of time of the overall audio content streaming baseline by dynamically determining to stream advertisements with a decreased duration when there is a decrease in duration of time remaining in each advertisement segment while still increasing the overall experience of the customer audience while satisfying the advertisement requirements. Audio content item streaming computing device 140 may then stream each music content item as dynamically determined during each music content item segment and stream each advertisement as dynamically determined during each advertisement segment.

Advertisement Streaming

Figure 2:
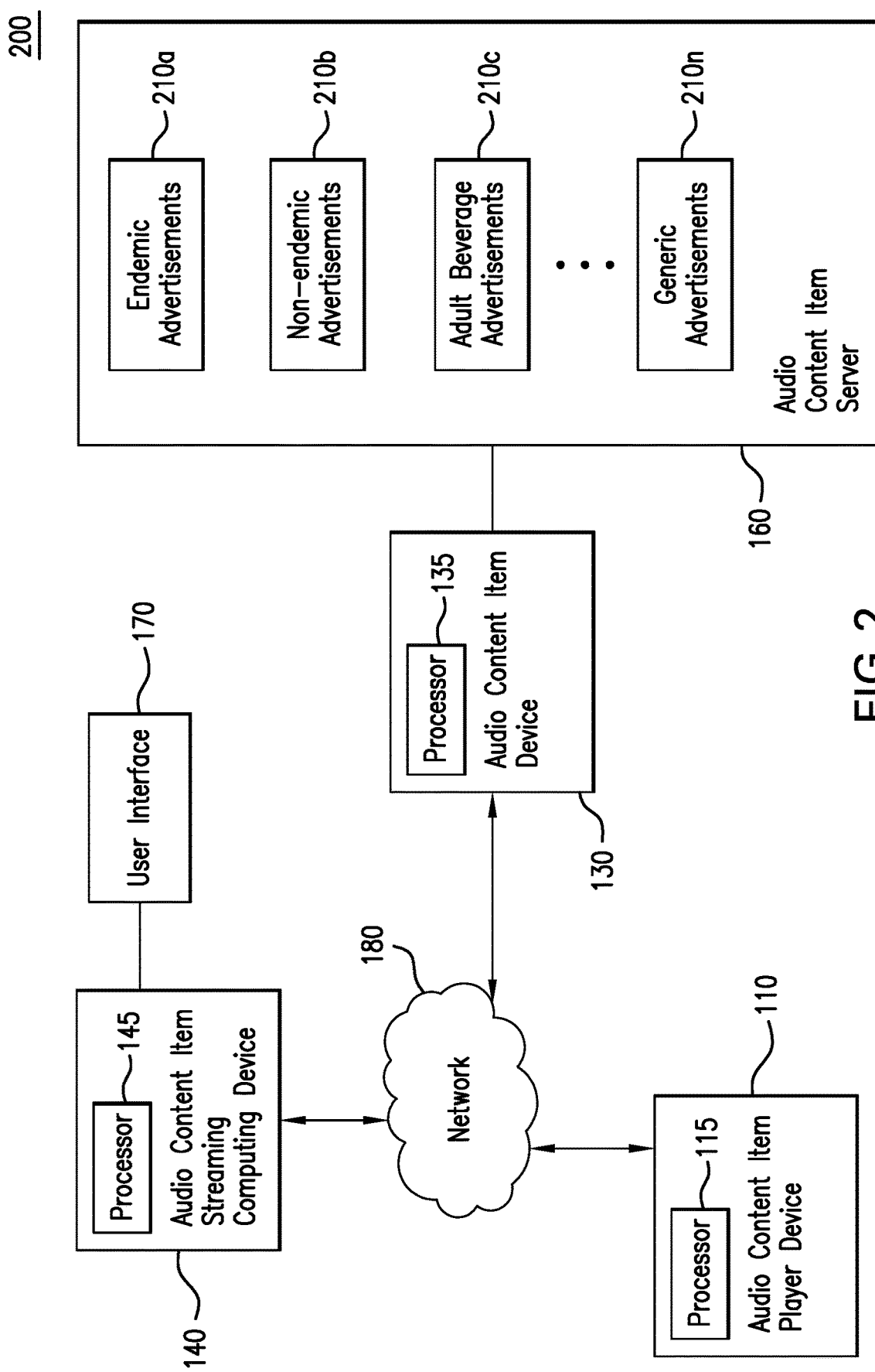
FIG. 2 shows an illustration of an advertisement streaming configuration where audio content item streaming computing device may stream advertisements.

FIG. 2 depicts an example advertisement streaming configuration 200 where audio content item streaming computing device 140 may stream advertisements. Specifically, audio content item device 130 may retrieve advertisements from audio content item server 160 based on the different advertisement streaming parameters and advertisement parameters requested by audio content item streaming computing device 140. Audio content item device 130 may retrieve from audio content item server endemic advertisements 210*a*, non-endemic advertisements 210*b*, adult beverage advertisements 210*c*, generic advertisements 210*n* and/or any other type of advertisement items that will be apparent to those skilled in the relevant art(s) without departing from the spirit and scope of the disclosure. Advertisement streaming configuration 200 shares many similar features with audio-out-of-home streaming system 100; therefore, only the differences between advertisement streaming configuration 200 and audio-out-of-home streaming system 100 are to be discussed in further detail.

Audio content item streaming computing device 140 may generate each advertisement segment from the overall audio content streaming baseline that is dynamically sequenced in the overall audio content streaming baseline based on the advertisement streaming parameters. Each advertisement segment is streamed relative to each duration of each music content item segment and is not constrained to a specified daypart of the overall audio content streaming baseline. Rather than disseminating each advertisement based on a specified daypart of the overall content streaming baseline, audio content item streaming device 140 may generate each advertisement segment based on the advertisement streaming parameters, such as the quantity of advertisements to be streamed during a block of time. In doing so, audio content item streaming computing device 140 streams each advertisement segment relative to the duration of each music content item segment, such as the quantity of songs streamed in each music content item segment.

Figure 3:
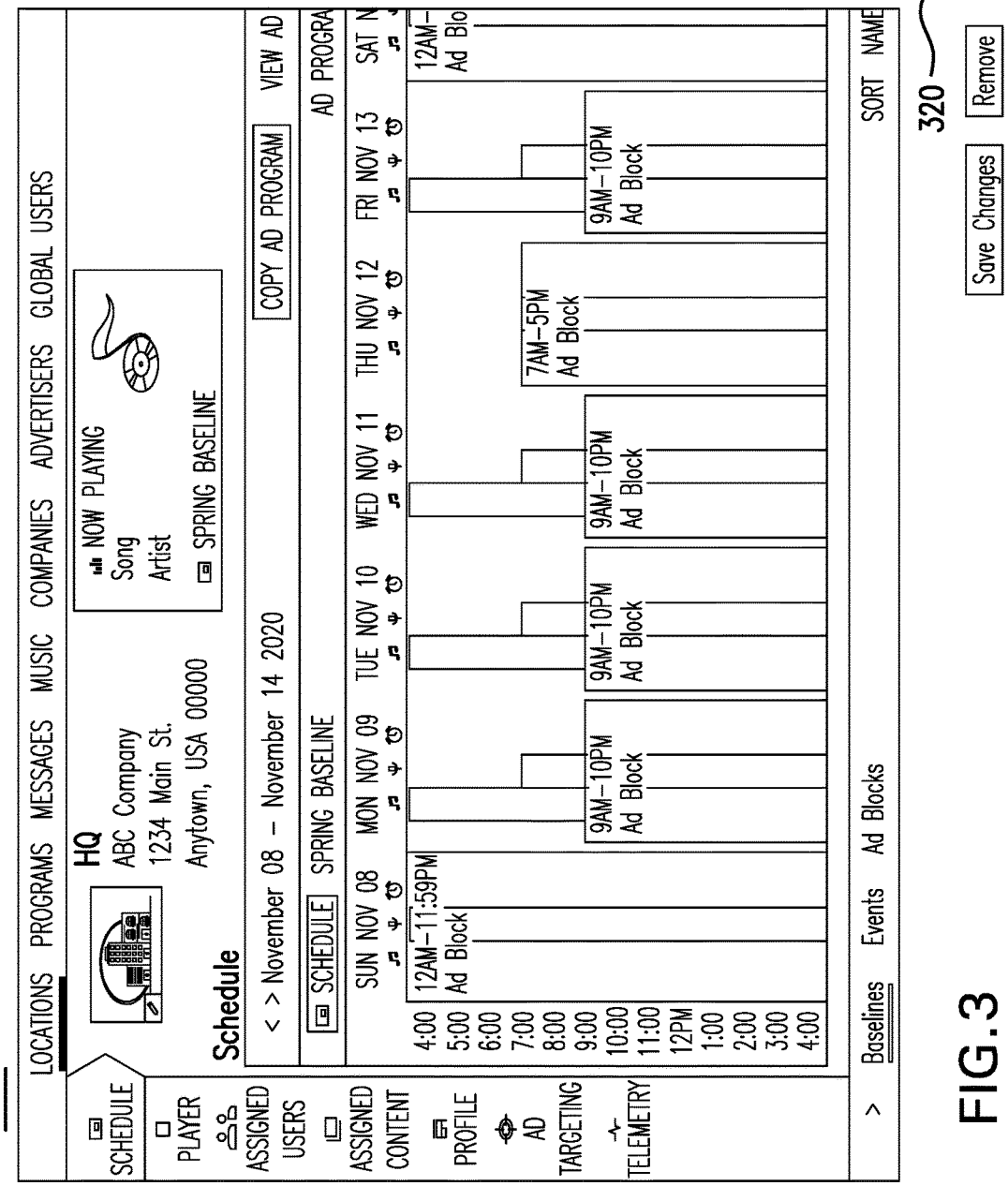
FIG. 3 shows an illustration of an example audio-out-of-home streaming configuration depicts that the advertisement streaming parameters of the quantity of advertisements to be streamed in a block of time as required by the retailer to satisfy.

For example, as shown in FIG. 3, an example audio-out-of-home streaming configuration 300 depicts that the advertisement streaming parameters of the quantity of advertisements to be streamed 310 in a block of time 350 as required by the retailer to satisfy. In such an example, the retailer is required to stream a quantity of advertisements that includes 26 advertisements in the block of time 350 of 12:00 am to 11:59 pm on Sunday. Audio content item streaming device 140 may then generate each advertisement segment in order to ensure that the quantity of advertisements 310 is satisfied in the block of time 350. In doing so, audio content item streaming device 140 may then determine that the duration of each advertisement segment 340 and the duration of each music content item segment 330. In this example, the duration of each advertisement segment 340 is to include a quantity of 2 advertisements and the duration of each music content item segment 330 is to include a quantity of 1 song.

Rather than disseminating each advertisement based on a specified daypart, audio content item streaming device 140 may segment overall audio content streaming baseline 360 into advertisement segments for the block of time 350 based on the advertisement streaming parameters. In this example, audio content item streaming device 140 segments the overall audio content streaming baseline 360 into advertisement segments during the block of time 350 of 12:00 am to 11:59 pm on Sunday. The advertisement streaming parameters include the quantity of advertisements to satisfy 310 in 26 advertisements to satisfy as well as the duration of each music content item segment 330 which in this example is the duration of one song streamed in each music content item segment as well as the duration of each advertisement segment 340 which is 2 advertisements in this example.

During each advertisement segment, audio content item streaming computing device 140 may stream each advertisement as dynamically determined based on the plurality of advertisement streaming parameters and satisfies a quantity of advertisements allocated to the corresponding advertisement segment. Audio content item streaming computing device 140 may determine the quantity of remaining advertisements from the quantity of advertisements remaining to be streamed based on advertisement parameters satisfied by each previously streamed advertisement and advertisement parameters remaining to be satisfied as required to be streamed by the retailer during the overall streaming baseline. As discussed in detail above, different advertisement streaming parameters may be required to be satisfied by the retailer within a specified block of time 350 in which different quantities of different types of advertisements may need to be streamed to satisfy contractual obligations of the retailer and so on.

As a result, the audio content item streaming computing device 140 may stream each advertisement as dynamically determined based on the advertisement streaming parameters and then track the quantity of advertisements streamed as well as the remaining advertisements required to be streamed in the specified block of time 350 to ensure the advertisement streaming parameters are satisfied. In continuing with the above example, the audio content item streaming computing device 140 tracks the quantity of advertisements to satisfy 310 in 26 advertisements to satisfy. Audio content item streaming computing device 140 then tracks that 13 advertisements satisfying the advertisement streaming parameters have been streamed so far in the specified block of time 350 and that 13 slots allocated to advertisements that satisfy the advertisement streaming parameters are available to be streamed and are to be satisfied before the specified block of time 350 expires.

Audio content item streaming computing device 140 may query a third party advertisement provider for each advertisement when each advertisement is to be streamed during each corresponding advertisement segment 340 based on the quantity of remaining advertisements remaining to be streamed due to the advertisement parameters satisfied and the advertisement parameters to be satisfied as required to be streamed by the retailer during the overall streaming baseline. Audio content item streaming computing device 140 may then stream each advertisement provided by the third party advertisement provider when queried from the third party advertisement provider. Audio streaming computing device 140 may determine when to query a third party advertisement provider, such as a Supply Side Platform (SSP) advertising provider, in order for the third party advertisement provider to provide the advertisement requested by the audio content item streaming computing device 140 to stream.

In doing so, audio content item streaming computing device 140 may determine the advertisement parameters that are to be satisfied based on the corresponding advertisement segment 340 which requires advertisements to be streamed. Audio content item streaming computing device 140 may then provide the advertisement parameters to the third party advertisement provider and the third party advertisement provider may then provide advertisements that satisfy the advertisement parameters that are to be streamed during the corresponding advertisement segment 340. Audio content item streaming computing device 140 may then stream during the advertisement segment the advertisements provided by the third party advertisement provider that satisfy the advertisement parameters. Continuing with the above example, audio content item streaming computing device 140 may determine that third party advertisements 320 provided by the third party advertisement provider for the specified block of time 350 are to satisfy different quantities of advertisement parameters. In this example, audio content item streaming computing device 140 may determine that 3 general advertisements, 3 self-promotion advertisements, 3 endemic advertisements, 3 non-endemic advertisements, and 3 adult beverage advertisements are to be provided by the third party advertisement provider and streamed by audio content item streaming computing device 140 during the specified block of time 350.

Audio content item streaming computing device 140 may generate each music content item segment 330 from the overall streaming baseline 360 that is dynamically sequenced in the overall streaming baseline based on the advertisement streaming parameters. Each music content item segment 330 is streamed relative to each duration of each music content item segment 330 required to be streamed before each corresponding subsequent advertisement segment is streamed. As discussed in detail above, audio content item streaming computing device 140 may determine the duration of each music content item segment 330 based on the advertisement streaming parameters which dictate the duration of each advertisement segment. Audio content item streaming computing device 140 may then dynamically sequence each duration of music content item segment 330 from the overall streaming baseline 360 based on the duration of each advertisement segment.

Continuing with the example above, audio content item computing device 140 may generate each music content item segment 330 of 1 song from the overall streaming baseline 360 based on each advertisement segment 340 of streaming 2 advertisements after the music content item segment 330 of 1 song is streamed and before the next music content item segment 330 of 1 song is streamed after the completion of the advertisement segment 340 of 2 advertisements are streamed. In doing so, audio content item computing device 140 may carve the overall streaming baseline 360 in a sequence such that each music content item segment 330 of 1 song is streamed before each advertisement segment 340 of 2 advertisements are streamed and then following the conclusion of each advertisement segment 340 with the following music content item segment 330 of 1 song.

During each music content item segment 330, audio content item computing device 140 may stream each music content item as dynamically determined based on the plurality of music content item parameters and satisfies a remaining duration of each corresponding music content item segment as allocated based on the advertisement streaming parameters. As discussed in detail above, audio content item computing device 140 may determine each music content item to stream based on the music content item parameters and satisfies the remaining duration of the music content item segment 330 that the music content item is to be streamed. Continuing with the above example, audio content item computing device 140 may determine the music content item to stream that satisfies the music content item parameters, such as the genre of music that is to be streamed, but may also select the music content item of 1 song that has a duration that does not prevent the quantity of advertisements 310 of 13 that are yet to be streamed to satisfy the 26 advertisements that are to be streamed during the block of time 350. In doing so, audio content item computing device 140 may refrain from streaming music content items during the music content item segment 330 that have such a long duration that prevent the streaming of the full 26 advertisements to be streamed during the block of time 350.

Audio content item computing device 140 may segment each overall audio content streaming baseline 360 into a plurality of messaging segments based on a plurality of messaging parameters. The messaging parameters are indicative to a quantity of messages to be streamed during each messaging segment. During each messaging segment, audio content item computing device 140 may dynamically determine each message to stream based on the plurality of messaging parameters associated with the messaging segment. The messaging parameters are indicative to each message that the retailer requests to stream during each corresponding messaging segment. Audio content item computing device 140 may stream each message as dynamically determined during each messaging segment.

As discussed in detail above, audio content item computing device 140 may segment the audio content streaming baseline 360 into messaging segments based on messaging parameters. For example, the messaging parameters may include the duration of each message as well as the quantity of messages that are to be played during the block of time 350 as well as the actual messages that the retailer requests to be streamed during the block of time. In an embodiment, audio content item computing device 140 may partition the message segments from the audio content streaming baseline 360 as based on the type and quantity of third party advertisements 320 that the retailer requests to be streamed during the block of time 350. In such an embodiment, audio content item computing device 140 determines the messaging segments to stream when determining the advertisement segments to stream.

In doing so, audio content computing device 140 may include the quantity of messages that the retailer requests to stream with the quantity of advertisements that audio content item computing device 140 has to partition the block of time 350 to include the advertisement segments to ensure the quantity of advertisements are streamed during the block of time 350 which includes the quantity of messages that are required to be streamed during the block of time. Continuing with the example above, the quantity of messages to be streamed during the block of time 350 is 3 messages as provided in the third party advertisements 320. Audio content computing device 140 may then segment the block of time 350 to ensure that the quantity of 3 messages are streamed in corresponding message blocks during the block of time as audio content computing device 140 determines each advertisement to stream in each corresponding advertisement block to ensure the quantity of 26 advertisements that includes the quantity of 3 messages are streamed during the block of time 350.

Audio content computing device 140 may generate each messaging segment from the overall streaming baseline 360 that is dynamically sequenced in the overall streaming baseline 360 based on a plurality of messaging segment parameters that is associated with each messaging segment. Each plurality of messaging segment parameters is indicative as to when each message included in each messaging segment is to be streamed in each corresponding messaging segment and relative to when each music content item segment is to conclude before each messaging segment is to commence. During each messaging segment, audio content computing device 140 may stream each message as dynamically determined based on the plurality of messaging segment parameters and following the conclusion of the corresponding music content item segment.

Audio content computing device 140 determine the messaging segment from the overall streaming baseline 360 to ensure that each music content item segment concludes before each messaging segment is to commence. In doing so, audio content computing device 140 may determine the message to be streamed based on the duration of the messaging segment as well as the messages that the retailer requests to be streamed during the block of time 350. Audio computing device 140 then determines each music content item to stream during the music content item segment to ensure the music content items streamed during the music content item segment are concluded before the message segment is to commence to ensure that each message required by the retailer to be streamed during the block of time is streamed during the block of time 350.

Audio content computing device 140 may generate a plurality of interrupt segments based on a plurality of interrupt parameters. Interrupt parameters are indicative to a corresponding specified time associated with the overall streaming baseline 360 that each corresponding interrupt is to be streamed. Audio content computing device 140 may overlay each interrupt segment onto each corresponding music content item segment that is streaming when each interrupt segment is scheduled to stream based on the corresponding specified time associated with the overall streaming baseline 360. Audio content computing device 140 may stream each interrupt at the corresponding specified time associated with the overall streaming baseline 360 based on the corresponding interrupt segment overlaid on the corresponding music content item segment that is streaming music content items simultaneously with each interrupt. A volume level associated with the streaming music content items is lowered for each interrupt that is simultaneously streamed to increase a likelihood that each interrupt is heard while the music content items are streamed simultaneously.

As discussed in detail above, audio content computing device 140 may generate a interrupt segments based on interrupt parameters. The interrupt parameters may determine the duration of the interrupt as well as the time during overall streaming baseline 360 that the interrupt is to be streamed by audio content computing device 140. Overall streaming baseline 360 is not partitioned to stream the interrupts as overall streaming baseline 360 is partitioned to stream the music content items, advertisements, and messages in which the overall streaming baseline 360 is partitioned such that each music content item segment, advertisement segment, and/or messaging segment concludes streaming before the subsequent segment commences streaming. Rather, audio content computing device 140 overlays each interrupt segment at the time in which the interrupt is to stream on the corresponding music content item segment, advertisement segment, and/or messaging segment that is streaming corresponding music content items, advertisements, and/or messages.

In doing so, audio content computing device 140 does not terminate the music content item, advertisement, and/or message that is currently streaming at the time the interrupt segment is to commence the streaming of the interrupt. Rather, audio content computing device 140 may lower the volume of the music content item, advertisement, and/or message that is currently streaming and then overlay the streaming of the interrupt such that the interrupt is heard over the streaming of the music content item, advertisement, and/or message currently streaming. As a result, audio content computing device 140 does not have to allocate time from the overall streaming baseline 360 to independently stream the interrupt but rather simultaneously streams the interrupt with the corresponding music content item, advertisement, and/or message.

CONCLUSION

It is to be appreciated that the Detailed Description section, and not the Abstract section, is intended to be used to interpret the claims. The Abstract section may set forth one or more, but not all exemplary embodiments, of the present disclosure, and thus, is not intended to limit the present disclosure and the appended claims in any way.

The present disclosure has been described above with the aid of functional building blocks illustrating the implementation of specified functions and relationships thereof. The boundaries of these functional building blocks have been arbitrarily defined herein for the convenience of the description. Alternate boundaries may be defined so long as the specified functions and relationships thereof are appropriately performed.

It will be apparent to those skilled in the relevant art(s) the various changes in form and detail can be made without departing from the spirt and scope of the present disclosure. Thus the present disclosure should not be limited by any of the above-described exemplary embodiments, but should be defined only in accordance with the following claims and their equivalents.

What is claimed is:

1. A computer-implemented method for streaming a plurality of audio content items at a retail location by a retailer to a customer audience positioned in the retail location to customize the audio content items streamed to the customer audience, comprising:

displaying, by an audio content streaming device, a graphical user interface to a user, the graphical user interface including controls to set, a music segment duration measured in number of songs, an advertisement segment duration measured in number of advertisements, a desired quantity of advertisements for play in an overall audio content streaming baseline measured in number of advertisements, and desired quantities of different types of advertisements for play in the overall audio content streaming baseline measured in number of advertisements for each of the different types of advertisements, the different types of advertisements including endemic advertisements;

segmenting, by the audio content streaming device, the overall audio content streaming baseline into a plurality of music content item segments and a plurality of advertisement segments based on a plurality of advertisement streaming parameters, wherein the advertisement streaming parameters are indicative of a quantity of advertisements that is required to be streamed by the retailer and when each advertisement is to be streamed until the quantity of advertisements streamed is satisfied, the plurality of advertisement streaming parameters including the music segment duration, the advertisement segment duration, and the desired quantity of advertisements;

during each music content item segment of the plurality of music content item segments, dynamically determining, by the audio content streaming device, each music content item to stream in the music content item segment based on a plurality of music content item parameters associated with the music content item segment, wherein the music content item parameters are indicative of a genre of music that the retailer requires to be streamed during each music content item segment and are dynamically adjusted as each music content item is streamed based on a duration remaining in the corresponding music content item segment;

during each advertisement segment of the plurality of advertisement segments, determining, by the audio content streaming device, each advertisement to stream in the advertisement segment based on a plurality of advertisement parameters, wherein the advertisement parameters are indicative as to a type of advertisement that the retailer requires to be streamed during each advertisement segment and are dynamically adjusted as each advertisement is streamed based on a remaining quantity of advertisements from the quantity of advertisements remaining to be streamed, the plurality of advertisement parameters including the desired quantities of the different types of advertisements for play in the overall audio content streaming baseline;

digitally streaming, by the audio content streaming device and via a communications network, each music content item as dynamically determined during each music content item segment to an audio content player positioned at the retail location;

digitally streaming, by the audio content streaming device and via the communications network, each advertisement as dynamically determined during each advertisement segment to the audio content player;

receiving, by the audio content player via the communications network, each music content item digitally streamed by the audio content streaming device during each music content item segment of the plurality of music content item segments;

receiving, by the audio content player via the communications network, each advertisement digitally streamed by the audio content streaming device during each advertisement segment of the plurality of advertisement segments;

playing, by the audio content player, each music content item received during each music content item segment of the plurality of music content item segments and each advertisement received during each advertisement segment of the plurality of advertisement segments;

identifying, by the audio content streaming device, a music content item segment of the plurality of music content item segments corresponding to a time at which an interrupt is to be streamed;

simultaneously digitally streaming, by the audio content streaming device and via the communications network, the interrupt and the music content item dynamically determined for the identified music content item segment;

receiving, by the audio content player via the communications network, the interrupt and the music content item dynamically determined for the identified music content item segment;

decreasing, by the audio content player, a volume level of the music content item dynamically determined for the identified music content item segment; and simultaneously playing, by the audio content player, the interrupt and the music content item dynamically determined for the identified music content item segment, wherein the music content item is played at the decreased volume level.

2. The method of claim 1, further comprising:
generating each advertisement segment from the overall streaming baseline that is dynamically sequenced in the overall streaming baseline based on the advertisement streaming parameters, wherein each advertisement segment is streamed relative to each duration of each music content item segment and is not constrained to a specified daypart of the overall streaming baseline.

3. The method of claim 2, further comprising:
during each advertisement segment, streaming each advertisement as dynamically determined based on the plurality of advertisement parameters and satisfies a quantity of advertisements allocated to the corresponding advertisement segment; and determining the quantity of remaining advertisements from the quantity of advertisements remaining to be streamed based on advertisement parameters satisfied by each previously streamed advertisement and advertisement parameters remaining to be satisfied by each remaining advertisement required to be streamed by the retailer during the overall streaming baseline.

4. The method of claim 3, further comprising:
querying a third party advertisement provider for each advertisement when each advertisement is to be streamed during each corresponding advertisement segment based on the quantity of remaining advertisements remaining to be streamed due to the advertisement parameters satisfied and the advertisement parameters to be satisfied as required to be streamed by the retailer during the overall streaming baseline; and streaming each advertisement provided by the third party advertisement provider when queried from the third party advertisement provider.

5. The method of claim 1, further comprising:
generating each music content item segment from the overall streaming baseline that is dynamically sequenced in the overall streaming baseline based on the advertisement streaming parameters, wherein each music content item segment is streamed relative to each duration of each music content item segment required to be streamed before each corresponding subsequent advertisement segment is streamed.

6. The method of claim 5, further comprising:
during each music content item segment, streaming each music content item as dynamically determined based on the plurality of music content item parameters and satisfies a remaining duration of each corresponding music content item segment as allocated based on the advertisement streaming parameters.

7. The method of claim 6, further comprising:
determining each percentage of each selected genre of music that is allocated to the overall streaming baseline via streaming music content items that satisfy each percentage of each corresponding selected genre of music;
dynamically determining each music content item that is to be streamed based on each percentage of each corresponding selected genre of music that is to be satisfied by a quantity of remaining music content items required to be streamed by the retailer during the overall streaming baseline and the duration of time remaining in the corresponding music content item segment; and
streaming each music content item as dynamically determined during each music content item segment.

8. The method of claim 1, further comprising:
segmenting the overall audio content streaming baseline into a plurality of messaging segments based on a plurality of messaging parameters, wherein the messaging parameters are indicative of a quantity of messages to be streamed during each messaging segment;
during each messaging segment, dynamically determining each message to stream based on the plurality of messaging parameters associated with the messaging segment, wherein the messaging parameters are indicative of each message that the retailer requests to stream during each corresponding messaging segment; and
streaming each message as dynamically determined during each messaging segment.

9. The method of claim 8, further comprising:
generating each messaging segment from the overall streaming baseline that is dynamically sequenced in the overall streaming baseline based on a plurality of messaging segment parameters that is associated with each messaging segment, wherein each plurality of messaging segment parameters is indicative as to when each message included in each messaging segment is to be streamed in each corresponding messaging segment and relative to when each music content item segment is to conclude before each corresponding messaging segment is to commence; and
during each messaging segment, streaming each message as dynamically determined based on the plurality of messaging segment parameters and following the conclusion of the corresponding music content item segment.

10. An audio-out-of-home streaming system for streaming a plurality of audio content items at a retail location by a retailer to a customer audience positioned in the retail location to customize the audio content items streamed to the customer audience, comprising:
a communications network;
an audio content player device positioned at the retail location;
an audio content streaming device communicatively coupled to the audio content player device, the audio content streaming device comprises a first processor and a first memory coupled with the first processor, the first memory including instructions that when executed by the first processor cause the first processor to:
display a graphical user interface to a user, the graphical user interface including controls to set a music segment duration measured in number of songs, an advertisement segment duration measured in number of advertisements, a desired quantity of advertisements for play in an overall audio content streaming baseline measured in number of advertisements, and desired quantities of different types of advertisements for play in the overall audio content streaming baseline measured in number of advertisements for each of the different types of advertisements, the different types of advertisements including endemic advertisements;
segment the overall audio content streaming baseline into a first plurality of music content item segments and a first plurality of advertisement segments based on a plurality of advertisement streaming parameters, wherein the advertisement streaming parameters are indicative of a quantity of advertisements that is required to be streamed by the retailer and when each advertisement is to be streamed until the quantity of advertisements streamed is satisfied, the plurality of advertisement streaming parameters including the music segment duration, the advertisement segment duration, and the desired quantity of advertisements;
during each music content item segment of the first plurality of music content item segments, dynamically determine each music content item to stream in the music content item segment based on a plurality of music content item parameters associated with the music content item segment, wherein the music content item parameters are indicative of a genre of music that the retailer requires to be streamed during each
during each advertisement segment of the first plurality of advertisement segments, dynamically determine each advertisement to stream in the advertisement segment based on a plurality of advertisement parameters, wherein the advertisement parameters are indicative as to a type of advertisement that the retailer requires to be streamed during each advertisement segment and are dynamically adjusted as each advertisement is streamed based on a remaining quantity of advertisements from the quantity of advertisements remaining to be streamed, the plurality of advertisement parameters including the desired quantities of the different types of advertisements for play in the overall audio content streaming baseline;
digitally stream, to the audio content player via the communications network, each music content item as dynamically determined during each music content item segment; and digitally stream, to the audio content player via the communications network, each advertisement as dynamically determined during each advertisement segment;

wherein the audio content player device comprises a second processor and a second memory coupled with the second processor, the second memory including instructions that when executed by the second processor cause the second processor to:

receive, via the communications network, each music content item digitally streamed by the audio content streaming device during each music content item segment of the first plurality of music content item segments and the second plurality of music content item segments;

receive, via the communications network, each advertisement digitally streamed by the audio content streaming device during each advertisement segment of the first plurality of advertisement segments and the second plurality of advertisement segments; and play each music content item received during each music content item segment of the plurality of music content item segments and each advertisement received during each advertisement segment of the plurality of advertisement segments;

wherein the first processor of the audio content streaming device is further configured to:

identify a music content item segment of the plurality of music content item segments corresponding to a time at which an interrupt is to be streamed; and simultaneously digitally stream, via the communications network, the interrupt and the music content item dynamically determined for the identified music content item segment to the audio content player;

wherein the second processor of the audio content player device is further configured to:

receive, via the communications network, the interrupt and the music content item dynamically determined for the identified music content item segment;

decrease a volume level of the music content item dynamically determined for the identified music content item segment; and simultaneously play the interrupt and the music content item dynamically determined for the identified music content item segment, wherein the music content item is played at the decreased volume level.

11. The audio-out-of-home streaming system of claim 10, wherein the first processor of the audio content streaming device is further configured to generate each advertisement segment from the overall streaming baseline that is dynamically sequenced in the overall streaming baseline based on the advertisement streaming parameters, wherein each advertisement segment is streamed relative to each duration of each music content item segment and is not constrained to a specified daypart of the overall streaming baseline.

12. The audio-out-of-home streaming system of claim 11, wherein the first processor of the audio content streaming device is further configured to:

during each advertisement segment, stream each advertisement as dynamically determined based on the plurality of advertisement parameters and satisfies a quantity of advertisements allocated to the corresponding advertisement segment; and determine the quantity of remaining advertisements from the quantity of advertisements remaining to be streamed based on advertisement parameters satisfied by each previously streamed advertisement and advertisement parameters remaining to be satisfied as required to be streamed by the retailer during the overall streaming baseline.

13. The audio-out-of-home streaming system of claim 12, wherein the first processor of the audio content streaming device is further configured to:

query a third party advertisement provider for each advertisement when each advertisement is to be streamed during each corresponding advertisement segment based on the quantity of remaining advertisements remaining to be streamed due to the advertisement parameters satisfied and the advertisement parameters to be satisfied as required to be streamed by the retailer during the overall streaming baseline; and stream each advertisement provided by the third party advertisement provider when queried from the third party advertisement provider.

14. The audio-out-of-home streaming system of claim 10, wherein the first processor of the audio content streaming device is further configured to generate each music content item segment from the overall streaming baseline that is dynamically sequenced in the overall streaming baseline based on the advertisement streaming parameters, wherein each music content item segment is streamed relative to each duration of each music content item segment required to be streamed before each corresponding subsequent advertisement segment is streamed.

15. The audio-out-of-home streaming system of claim 14, wherein the first processor of the audio content streaming device is further configured to stream, during each music content item segment, each music content item as dynamically determined based on the plurality of music content item parameters and satisfies a remaining duration of each corresponding music content item segment as allocated based on the advertisement streaming parameters.

16. The audio-out-of-home streaming system of claim 15, wherein the first processor of the audio content streaming device is further configured to:

determine each percentage of each selected genre of music that is allocated to the overall streaming baseline via streaming music content items that satisfy each percentage of each corresponding selected genre of music;

dynamically determine each music content item that is to be streamed based on each percentage of each corresponding selected genre of music that is to be satisfied by a quantity of remaining music content items required to be streamed by the retailer during the overall streaming baseline and the duration of time remaining in the corresponding music content item segment; and stream each music content item as dynamically determined during each music content item segment.

17. The audio-out-of-home streaming system of claim 10, wherein the first processor of the audio content streaming device is further configured to:

segment the overall audio content streaming baseline into a plurality of messaging segments based on a plurality of messaging parameters, wherein the messaging parameters are indicative of a quantity of messages to be streamed during each messaging segment;

during each messaging segment, dynamically determine each message to stream based on the plurality of messaging parameters associated with the messaging segment, wherein the messaging parameters are indicative of each message that the retailer requests to stream during each corresponding messaging segment; and stream each message as dynamically determined during each messaging segment.

18. The audio-out-of-home streaming system of claim 17, wherein the first processor of the audio content streaming device is further configured to:
   generate each messaging segment from the overall streaming baseline that is dynamically sequenced in the overall streaming baseline based on a plurality of messaging segment parameters that is associated with each messaging segment, wherein each plurality of messaging segment parameters is indicative as to when each message included in each messaging segment is to be streamed in each corresponding messaging segment and relative to when each music content item segment is to conclude before each corresponding messaging segment is to commence; and
   during each messaging segment, stream each message as dynamically determined based on the plurality of messaging segment parameters and following the conclusion of the corresponding music content item segment.

* * * * *